United States Patent [19]

Yun

[11] Patent Number: 4,947,263

[45] Date of Patent: Aug. 7, 1990

[54] IMAGE SIGNAL SELECTOR FOR TELEVISION RECEIVER COMBINED WITH VIDEO CASSETTE RECORDER

[75] Inventor: Jin H. Yun, Kyungsangbuk, Rep. of Korea

[73] Assignee: Goldstar Co., Ltd., Seoul, Rep. of Korea

[21] Appl. No.: 221,896

[22] Filed: Jul. 20, 1988

[30] Foreign Application Priority Data

Jul. 31, 1987 [KR] Rep. of Korea ............... 1987/12877

[51] Int. Cl.$^5$ .......................................... H04N 5/76
[52] U.S. Cl. ................................................. 358/335
[58] Field of Search ................. 360/33.1, 61; 358/310, 358/335, 340; 369/19, 20

[56] References Cited

U.S. PATENT DOCUMENTS

| | | | |
|---|---|---|---|
| 4,031,548 | 6/1977 | Kato et al. | 358/335 |
| 4,267,563 | 5/1981 | Sato et al. | 358/335 |
| 4,435,842 | 3/1984 | Mayumi et al. | 358/337 |

Primary Examiner—Donald McElheny, Jr.
Attorney, Agent, or Firm—Anthony J. Casella; Gerald E. Hespos

[57] ABSTRACT

The invention provides a device that selects the input image signal out of image signals of a TV set, VCR and an external apparatus in the TV with VCR. The device includes two ICs for switches Nos. 1 and 2, muting circuits 4 and 5, inverters 8, image signal insulation section 12, LED drive 17 and photocoupler 18. The ICs operate the internal switches according to the low or high voltage applied to respective control terminals T0, T1 and L0, L1. The image signal insulation 12 insulates to perform amplification and DC clamping in compliance with the input image signals.

6 Claims, 1 Drawing Sheet

IMAGE SIGNAL SELECTOR FOR TELEVISION RECEIVER COMBINED WITH VIDEO CASSETTE RECORDER

BRIEF SUMMARY OF INVENTION

The present invention relates to an image signal selector for a television receiver combined with a video cassette recorder (hereinafter referred to as TV-VCR), in particular, an image signal selector that selects the input image signal out of those of a TV receiver, a VCR and another external apparatus in compliance with respective use mode and applies the selected signal to the image signal input of TV-VCR with no interference from the other source signals.

In the prior art, a complex set of TV-VCR has to select one of the input image signals from the TV receiver, the VCR output and another apparatus by switching a selector in accordance to the selected use mode to apply the input signal to the image signal input of the TV receiver. However, the conventional selector has the fault of frequently malfunctioning in performance and often brings the intrusion of unwanted image signals for the mixture of image signals to result in the poor quality of pictures, to the further consequence of the low quality and reliability of the TV-VCR.

The object of the present invention is to achieve the correct operation of the image signal selector for the TV-VCR and prevent the intrusion of unwanted image signals to improve the picture quality and upgrade the whole product.

Figure 1:
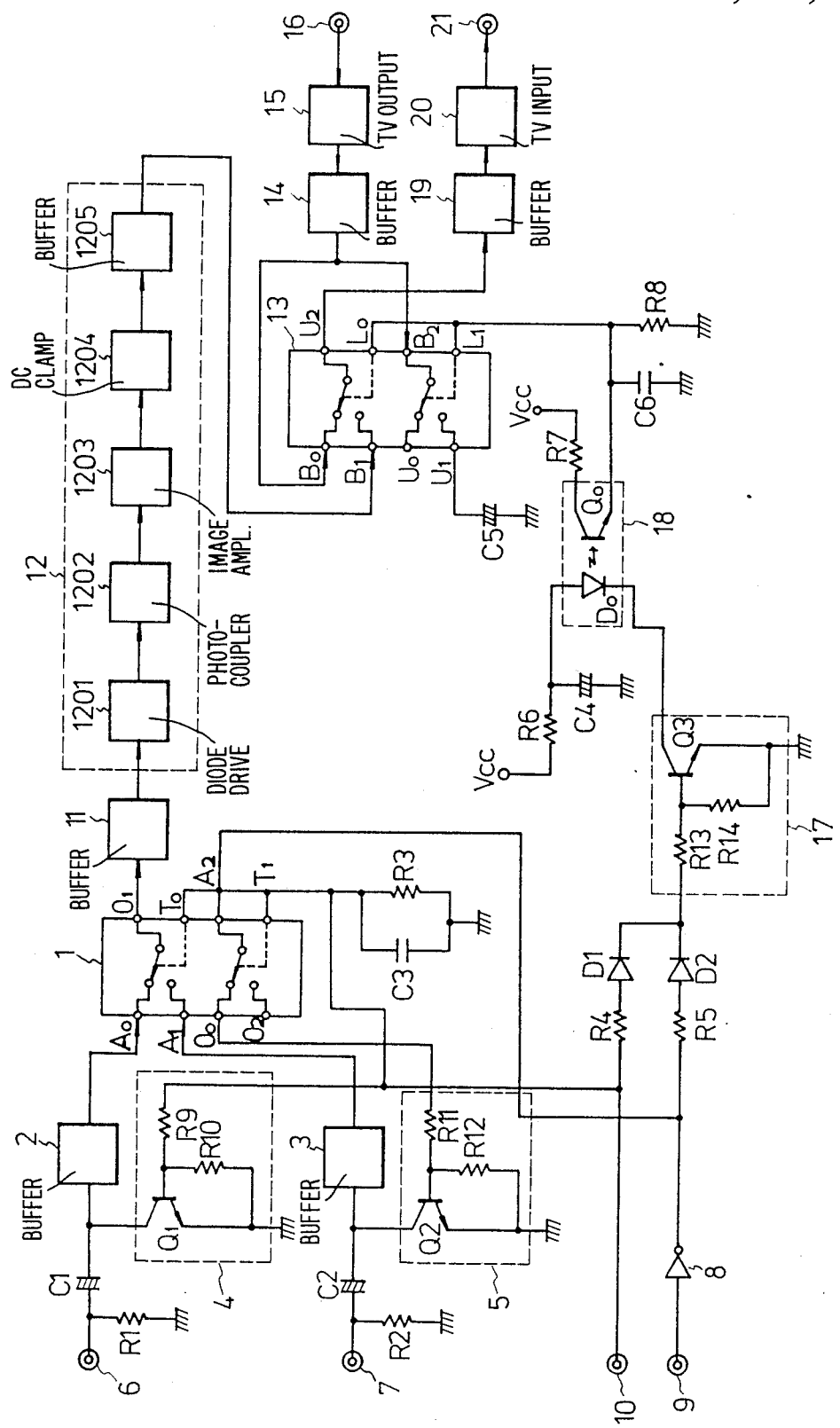
FIG. 1 shows the circuit of the invention.

Numerals in the drawing indicate the following: Numeral 1 indicating an integrated circuit (IC) for a switch No. 1, 2 and 3 buffers, 4 and 5 muting circuits, 6 the image signal input of the VCR, 7 the image signal input of an external apparatus, 8 an inverter, 9 a control terminal, 13 an integrated circuit for a switch No. 2.

DETAILED DESCRIPTION OF THE INVENTION

Referring to the drawing, the invention shall be described in details.

According to the invention, inputs A0 and A1 of IC 1 for switch No. 1 respectively connect with VCR image signal input 6 and image signal input 7 of the external apparatus via buffers 2 and 3 and with muting circuits 4 and 5, and input A2 connects with VCR image signal control 9 via inverter 8. Switching control terminals T0 and T1 both connect to the image signal control terminal 10 of the external apparatus and to the input of muting circuit 4. Output 00 of IC 1 connects to muting circuit 5, and output 01 connects with the input B1 of IC 13 for switch No. 2 via buffer 11 and image signal insulation section 12. Outputs B0 and B2 of IC 13 both connect with TV image signal input 16 via buffer 14 and TV image output section 15. Control terminals L0 and L1 are arranged to receive control signals from the VCR image signal control 9 and the external apparatus image signal control 10 respectively via resistors R4 and R5, diodes D1 and D2, LED drive 17 and photocoupler 18. Output U2 of IC 13 connects with image signal output 21 via buffer 19 and TV image input section 20.

Numeral and literal codes not mentioned above indicate the following: Numeral 1201 indicating an ultrared ray diode drive of the photocoupler, 1202 a photocoupler, 1203 an image amplifying circuit, 1204 a direct current claming circuit, 1205 a buffer, 02 the output of IC 1, U0 and U1 outputs of IC 13, C1-C6 capacitors, R1, R2, R3, R6-R14 resistors, D0 a LED, Q0 a phototransistor, Vcc a power source.

The operation of the invention shall be described in details. The ICs 1 and 13 for switchings operate the internal switches in accordance to the voltage (low or high) applied to respective control terminals T0, T1 and L0, L1. The image signal insulation section 12 insulates image signals with the front and rear sections of the photocoupler 1202 to perform amplification of DC clamping in compliance with respective input image signals. Upon switching on the selector for a desired image signal, the VCR control 9 and the external apparatus control 10 receive either the low or the high signal.

For example, upon switching the TV-VCR of the invention to the TV use mode, image signal control 10 of the external apparatus receives the low input signal while VCR image signal control 9 receives the high input signal. The low signal is inverted by inverter 8 and applies to LED drive 17 to cut it off and turn off photocoupler 18. Accordingly, control terminals L0 and L1 of IC 13 for switch No. 2 are applied with low signals to make the internal switch operate to connect the input B0 to the output U2 and the input B2 to the output U0.

Then, the TV image signal applied to the TV image signal input 16 passes through TV image output section 15, buffer 14, input B0, output U2, buffer 19, and TV image input section 20, to be given as output from image signal output terminal 21. But when the VCR use mode is selected, the high signal is applied to control 10 of the external apparatus, while the low signal is applied to control 9 of the VCR. Accordingly, the low signal applies to control terminals T0 and T1 of IC 1 for switch No. 1 to switch on as follows: input A0 connects to output 01 and input A2 connects to output 00. Therefore, the VCR image signal given to VCR image signal input 6 applies to image signal insulation section 12 via buffer 2, input A0, output 01 and buffer 11; and the inverted high signal from inverter 8 applies to muting circuit 5 via input A2 and output 00 to turn on transistor Q2. Accordingly, the input 7 of the external apparatus is grounded to eliminate the intrusion of the image signal of the external apparatus. Then, the VCR image signal given to the insulation section 12 passes the steps of amplification and noise elimination to be given further to input B1 of IC 13 for switch No. 2.

On the other hand, the low signal is applied to VCR image signal control 9 such that the inverted high signal from the inverter 8 applies via resistor R5 and diode D2 to the LED drive 17 to turn on transistor Q3. Consequently, the LED D0 lights up to turn on phototransistor Q0 to apply the high signal to controls L0 and L1 of IC 13 and switch on as follows: input B1 connects to output U2, and input B2 connects to output U1.

As a result, the VCR image signal applied to input B1 is given out of the image signal output 21 via output U2, buffer 19 and TV image input section, and the TV image signal given formerly to the buffer 14 is this time diverted via input B2 and output U1 to be grounded through capacitor C5, thus excluding the TV image signal from interference.

In the case of selecting the external apparatus image signal, the control 10 of external apparatus is applied with the high signal while the control 9 of the VCR is applied with the low signal. Thus, the internal switch of IC 13 for switch No. 2 makes the same connection as in the case of the VCR image signal mode, but the internal switch of IC 1 with the high signal applied to its control terminals T0 and T2 switches on as follows: input A1 connects to output 01, and input A2 connects to output 02.

Therefore, the high signal from the control 10 of the external apparatus is given to muting circuit 4 to turn on transistor Q2 and ground the image signal inputs of the VCR and excludes the VCR image signal from intrusion, while the image signal given to the external apparatus input 7 passes through buffer 3, input A1, output 01 and buffer 11 to be applied to the insulation section 12, and the signal thereon takes the same route as in the case of the VCR mode to be given out of the image signal output 21.

As shown above, the present invention provides a device that can make correct selection among multiple input image signals without interferences with one another signal in a television receiver combined with a VCR, thus preventing confusion of signals to the effects of improving the picture quality and enhancing the product reliability.

What is claimed is:

1. A switching device for use with an interconnected assembly of a VCR, a TV receiver and an external apparatus, each of which is operative to generate an image signal, said assembly further comprising selection means for selecting one of said image signals, said switching device comprising:

VCR and external image signal controls for respectively generating signals in response to selection of one of the VCR image signal and the image signal of the external apparatus;

first and second integrated circuits, each said integrated circuit comprising first, second and third inputs, first and second outputs, a first internal switch for completing a circuit between the first output and a selected one of said first and second inputs, a second internal switch for selectively completing a circuit between said second output and said third input and first and second control terminals for controlling the first and second internal switches respectively;

VCR input means for selectively delivering the VCR image signal to the first input of the first integrated circuit;

first muting means connecting the external image signal control and the VCR input means for selectively muting the VCR image signal;

external input means for selectively delivering the image signal from the external apparatus to the second input of first integrated circuit;

second muting means connecting the second output of the first integrated circuit and the external input means for selectively muting the image signal of the external apparatus;

control circuit means connecting the control terminals of the first integrated circuit to the image signal controls of the VCR and external apparatus and to the first muting means;

an image signal insulation means connecting the first output of the first integrated circuit and the second input of the second integrated circuit for receiving signals from a selected one of the VCR and the external apparatus in accordance with orientation of the first internal switch of the first integrated circuit, the image signal insulation section being operative to amplify the selected signal;

TV input means for delivering the TV image signal to the first and third inputs of the second integrated circuit;

image output means for delivering a selected signal from the first output of the second integrated circuit and to the TV receiver;

photocoupler means connecting the VCR and external image signal controls to the control terminals of the second integrated circuit for controlling the internal switches of the second integrated circuit;

whereby upon selection of the TV image signal, the first control terminal of the second integrated circuit operates the first internal switch thereof for completing the circuit between the first input and the first output thereof and thereby completing the circuit between the TV input means and the image output means; and whereby upon selection of one of the VCR image signal and the external image signal, the VCR and external image signal controls operate the first internal switch of the first integrated circuit to complete the circuit between the selected one of the VCR and external inputs and the first output thereof thereby completing a circuit from the selected input and the image signal output.

2. A switching device as in claim 1 further comprising a ground connected to the second output of the second integrated circuit for selectively grounding the signal from the TV input means in response to completion of the circuit thereto by the second internal switch of the second integrated circuit.

3. A switching device as in claim 1 wherein the VCR circuit means comprises a buffer, and wherein the first muting means is connected to the VCR circuit means intermediate the VCR input and the buffer.

4. A switching device as in claim 1 wherein the external circuit means further comprises a buffer, and wherein the second muting means is connected to the external circuit means intermediate the external input and the buffer.

5. A switching device as in claim 1 further comprising a signal inverter connected between the VCR image signal control and both the first and second integrated circuits.

6. A switching device as in claim 1 wherein the photocoupler means comprises VCR and external resistors and VCR and external diodes connected in series respectively to the VCR and external signal controls, an LED drive connected to said diodes and a photocoupler operatively connected to said LED drive, said photocoupler being connected to the first and second control terminals of the second integrated circuit for controlling the internal switches thereof.

* * * * *